United States Patent Office 3,445,576
Patented May 20, 1969

3,445,576
BROMODIFLUORONITROMETHANE FOR CONTROL OF INSECTS, FUNGI AND NEMATODES
Eugene E. Kenaga, Midland, Mich., assignor to The Dow Chemical Company, Midland, Mich., a corporation of Delaware
No Drawing. Filed Sept. 3, 1963, Ser. No. 306,331
Int. Cl. A01n *9/20, 7/04*
U.S. Cl. 424—349                    1 Claim

ABSTRACT OF THE DISCLOSURE

A method for controlling insects, fungi and nematodes which includes fumigation of matter infested with at least one such organism with a lethal concentration of bromodifluoronitromethane, and fumigant compositions containing the same as the active ingredient thereof.

---

The present invention relates to fumigation and is particularly concerned with an improved method and composition for the control of undesirable organisms and particularly in soil and grain and its milled products.

The application of fumigant materials offers an excellent method for the control of many pests such as nematodes, insects, bacteria and fungi and particularly the pests to be found in soil and in grain and its milled products. However, the utilization of such a method has been severely limited by the inability of many fumigant materials to penetrate in lethal concentrations to any substantial depth in soil, grain or flour. The use of others of the known fumigant materials has been generally hampered by the disagreeable odor and flavor characteristics which they impart to matter fumigated. Thus, the hazard of off-flavor and ill-smelling grain has curtailed widespread employment of many such materials. These shortcomings of known treatment methods have created special difficulties in the fumigation of these products.

It is an object of the present invention to provide a new and improved method of fumigation for the control of many pests such as nematodes, bacteria, molds and insects. Another object is to provide an improved method for the fumigation of soil. It is a further object to provide a method and composition for the fumigation of grain and its milled products. Another object is the provision of a method and composition which will accomplish superior penetration of such products. An additional object is the provision of a method which does not impart an off-taste or offensive odor to fumigated materials. Other objects will become apparent from the following specification and claims.

According to the present invention, it has been discovered that matter such as soil or grain mill products infested or infected with seeds, bacteria, fungi, molds, round worms, nematodes and insects advantageously may be fumigated and the organisms controlled by treatment with bromodifluoronitromethane. More particularly, it has been discovered that gain and its milled products and other foodstuffs may be fumigated with or exposed to the vapors of this methane compound to control mold organisms and insects without imparting undesirable taste or odor characteristics to the fumigated product. Many such fumigation operations conveniently are carried out in an enclosed space or otherwise to insure a sufficient period of contact of the fumigant with the infesting organisms.

Bromodifluoronitromethane is a non-flammable, non-corrosive gaseous material which boils at about 40° C. at 752 millimeters pressure. The compound is somewhat soluble in many organic solvents and has a very low solubility in water at room temperature. It is adapted to be easily and conveniently employed for the fumigation of soil and grain and its milled products. The compound has very desirable penetrating properties which enable its vapors to diffuse through and permeate in lethal concentration the interstices of soil and grain and its milled products within a relatively short period of time and to depth much greater than is the case with many known fumigant materials. It is an advantage of the present invention that the methane compound is both ovicidal and parasiticidal and kills and controls the growth of eggs as well as the larvae and adults of many organisms. It is an additional advantage of the present invention that soil treating operations employing the methane compound induce soil changes which improve the ability of soil to support plant growth and the growth characteristics of crops raised on the treated soil.

The exposure of the infesting organisms or their eggs to at least a minimum effective dosage of the compound is essential for the practice of the present invention. In mill fumigations, this dosage amounts to a lethal or pesticidal concentration. When fumigating grain and its milled products, good results are obtained when the methane compound is employed in the amount of about 0.02 pound per thousand cubic feet of space within which the product is enclosed. Under optimum conditions, satisfactory controls may be obtained with as little as 0.01 pound per 1000 cubic feet. Large amounts of 20 pounds or more per 1000 cubic feet of space can be employed but are unnecessary from the standpoint of economy.

In fumigating soil, the distribution of at least a minimum effective dosage of the methane compound in the soil is essential and critical. In general, good improvements in the ability of soil to support plant growth and good controls of nematodes and fungi are obtained when the compound is distributed in the soil in the amount of at least 0.5 part by weight per million parts by weight of soil. In the preferred practice, the compound is usually distributed in the soil in amounts not greater than about 100 parts by weight per million. In field applications, the compound can be distributed in the soil at adosage of from 0.1 to 400 pounds or more per acre and through such a cross-section of soil as to provide for the presence therein of an effective concentration of the treating agent. In general field applications, it is usually preferred that the compound be distributed to a depth of from 3 to 6 inches. Oftentimes, it is desirable to distribute the compound to a depth of 24 or more inches to avoid reinfestation of the soil from deep dwelling nematodes and fungi which cause plant disease, or through that section of the soil known as the root zone as in row treatments.

In one embodiment of the invention, the treated soil is planted with the desired crop plant following the distribution of the methane compound in the soil. Where minimum dosages of the compound are distributed in soil, the treated soil may be immediately planted with the desired crop. Following the distribution of larger dosages of the methane compound, it is desirable that any planting operation not be carried out for a period of several days, the exact period depending upon the concentration of the compound in the soil and the resistance of the plant species concerned to the compound. Where the compound is employed for the treatment of the soil adjacent to the root systems of established plants having resistance to the compound, the existing vegetation is not unfavorably affected by minimum effective concentrations of the compounds temporarily present in the soil.

In carrying out the present invention, the matter to be fumigated may be exposed to the methane compound and its vapors in any convenient manner. When fumigating grain, the grain is placed in an enclosure together with the required amount of the compound. In such operations, the compound may be introduced generally into the enclosure or at various levels within the stored grain. In the fumigation of flour and milled grain products, the latter are generally bagged and thereafter placed in an enclosure together with the required amount of bromodifluoronitromethane. The exposure of the infested material and undesirable organisms may be carried out in some other gas than air, e.g., nitrogen or carbon dioxide.

In an alternative method, the methane compound is dissolved or otherwise incorporated in a fumigant adjuvant, e.g., a volatile organic solvent diluent such as acetone, or volatile liquid halo-aliphatic compound or chloroform, or volatile petroleum distillate, and the resulting mixtures employed in the manner as previously described. A propellant such as sulfuryl fluoride, chlorotrifluoromethane or difluorodichloromethane can be mixed with such solvent compositions in a sealed container or cylinder. Such compositions are particularly useful in the line fumigation of packaged products where the fumigant material is introduced directly into the package. The preferred organic solvent carriers are those of such volatility that they evaporate from the matter treated and leave little permanent residue therein. The exact concentration of the methane compound to be employed in these solvent compositions is not critical. The required dosage of the compound generally may be supplied with compositions containing from about 1 to 90 percent by weight of toxicant.

According to the present invention, grain and its milled products are generally exposed to the vapors for a period of at least two hours or longer, the exact period of time being dependent upon the nature and size of the treating chamber and the ease with which the vapors may penetrate the product to be fumigated, e.g., whether grain or flour is concerned. In smaller enclosures, exposures from a few minutes to a few hours may be sufficient to accomplish penetration and the killing of the organisms. In large enclosures and with large quantities of grain and its milled products, periods up to 72 hours or longer may be desirable.

The treatment of soil can be carried out by distributing the unmodified methane compound through the growth medium as by impregnation. However, the present method also embraces the employment of a liquid or dust composition containing the compound. In such usage, the compound is modified with one or a plurality of additaments or soil treating or parasiticide adjuvants, including water or other liquid carriers, surface active dispersing agents and finely divided inert solids. Depending upon the concentration of toxicant, such augmented compositions are adapted to be distributed in the soil or employed as concentrates and subsequently diluted with additional inert carrier to produce the ultimate treating compositions. The required amount of the methane compound in the growth media conveniently can be supplied per acre treated in from five gallons to five acre inches or more of the liquid carrier or in from about 20 to 2000 pounds of the solid carrier. In the modified compositions, the adjuvant or carrier cooperates with the active ingredient to obtain an advantage and to contribute to the usefulness and effectiveness of the invention.

The exact concentration of the methane compounds to be employed in compositions for the treatment of growth media can vary provided the required dosage of effective agent is supplied in the medium. The concentration of toxicant in liquid compositions employed to supply the desired dosage generally is from about 0.000025 to 50 percent by weight, although compositions containing as high as 90 percent are sometimes employed. In dusts, the concentration of the methane compound can be from about 0.01 to 20 percent by weight. In compositions to be employed as concentrates, the toxicant can be present in a concentration of from about 5 to 98 percent by weight.

Liquid compositions containing the desired amount of the methane compound are prepared by dispersing the toxicant in water with the aid of a suitable surface active dispersing agent such as an ionic or non-ionic emulsifying agent. Such compositions can contain from one or more water-immiscible solvents for the methane compound. In such compositions, the carrier comprises an aqueous emulsion, i.e., a mixture of water-immiscible solvent, emulsifying agent and water. The choice of dispersing and emulsifying agent and the amount thereof employed is dictated by the nature of the composition type and by the ability of the agent to facilitate the dispersion of the methane compound in the aqueous carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the methane compound is dispersed in and on a finely divided inert solid such as talc, chalk, gypsum and the like. In such operations, the carrier is mechanically ground with the compound or wet with a volatile organic solvent solution thereof. Similarly, dust compositions containing the compound can be prepared from various of the solid surface active dispersing agents, such as bentonite, fuller's earth, attapulgite and other clays. Depending upon the proportions of ingredients, these dust compositions can be employed as concentrates and subsequently diluted with additional solid surface active dispersing agent or with talc, chalk or gypsum and the like to obtain the desired amount of active ingredient in the composition adapted to be employed for the treatment of soil. Also, such concentrate dust compositions can be dispersed in water with or without the aid of a dispersing agent to form aqueous soil treating compositions.

When operating in accordance with the present invention, the soil can be impregnated with the methane compound, or a composition containing the toxicants, in any convenient fashion, e.g., by simple mixing with the soil, by applying to the surface of soil and thereafter dragging or discing into the soil to the desired depth or by employing water to accomplish the penetration and impregnation.

In a further embodiment, bromodifluoronitromethane, or compositions containing the same, advantageously can be employed in the present methods in combination with one or more other fumigants either as adjvants or supplemental materials. Representative additives an agents include ethylene bromide,
carbon tetrachloride,
ethylene chloride,
propylene oxide,
isopropyl formate,
O,O-diethyl O-(2-isopropyl-6-methyl-4-pyrimidyl) thiophosphate,
hydrogen cyanide,
trichlorobromomethane,
acrylonitrile,
carbon bisulfide,
1,2,3,4,10,10-hexachloro-6,7-epoxy-1,4,4a,5,6,7,8,8a-1,4,5-endoexo-octahydrodimethanonaphthalene,
trichloroethylene,
tetrachloroethylene,
propylene chloride,
methyl bromide,
benzene hexachloride,
chloropicrin,
1,1,1-trichloro-2,2-bis(p-chlorophenyl)ethane,
$\beta,\beta'$-dichloroethyl ether,
1,3-dichloropropene,
1,2-dibromo-3-chloropropane,
1,2,3,4,10,10-hexachloro-1,4,4a,5,8,8a-hexahydro-1,4,5,8-endoexo-dimethanonaphthalene,
propargyl bromide and
1,2,3-tribromopropane.

The expressions "growth media" or "soil" are employed in the present specification and claims in their broadest sense to be inclusive of all conventional "soils," as defined in Webster's New International Dictionary, second edition, unabridged, published in 1937 by G. and C. Merriam Company, Springfield, Mass. Thus, the terms refer to any substances or media in which vegetation may take root and grow, and are intended to include not only earth but compost, manure, muck, humus and sand and the like, adapted to support plant growth.

The following examples illustrate the invention but are not to be construed as limiting the same.

EXAMPLE 1

Bromodifluoronitromethane is employed for the fumigation of an enclosure, the inner walls and surfaces of which were infested with adult confused flour beetles (*Tribolium confusum*). In such operations, the compound is introduced into the enclosure in an amount sufficient to provide a concentration of 0.05 pound of toxicant vapors per 1000 cubic feet of space. The interior surfaces of the enclosure and its infesting organisms are thereafter exposed to the vapors for a period of 16 hours and at a temperature of about 80° F. As a result of these operations, there is obtained a 100 percent kill of the infesting organism.

EXAMPLE 2

In a similar operation, bromodifluoronitromethane is employed for the control of black carpet beetle larvae (*Attagenus piceus*). As a result of such operations, a 100 percent kill of the bettles is obtained with a concentration of 0.03 pound of toxicant per 1000 cubic feet of space.

EXAMPLE 3

Bromodifluoronitromethane is also employed as described in Example 1 for the control of granary weevil (*Sitophilus granarius*). In such operations, a 100 percent control of the weevil is obtained with a concentration of 0.1 pound of toxicant per 1000 cubic feet of space.

EXAMPLE 4

Bromodifluoronitromethane is also employed for the fumigation of corn, wheat and beans. In these operations, one of the above seed types infested with black carpet beetle larvae and confused flour beetle adults, is placed in a fumigant chamber and a 0.5 percent solution of bromodifluoronitromethane in carbon tetrachloride introduced into the chamber in an amount sufficient to provide a concentration of 1 pound of the nitromethane compound per 1000 cubic feet of space. In the fumigation operations, each of the seed types is exposed to the vapors of the nitromethane compound in the composition for a period of 16 hours. As a result of these operations, there is obtained a 100 percent control of the infesting organisms in each of the fumigated grains. Following the fumigation operations, the grain is aerated for one week. At the end of this period, no off-taste or offensive odor attributable to the action of the bromodifluoronitromethane compound is found in the fumigated seed. Tests are also carried out in which the fumigated seed and unfumigated seed are planted to ascertain whether or not the treatments had affected germination. The determinations show that the fumigation operations have not adversely affected the viability of the corn, wheat or beans.

EXAMPLE 5

Bromodifluoronitromethane is mixed with liquefied dichlorodifluoromethane in a cylinder to prepare a self-propellent fumigant composition containing 85 percent by weight of toxicant. This composition is introduced into an airtight bin of oats which is infested with adult confused flour beetle and black carpet beetle pupae. The amount of fumigant composition employed is sufficient to provide a concentration of 1 pound of the vapors of the bromodifluoronitromethane compound per 1000 cubic feet of space. The oats are stored in the bin to a depth of 6 feet. After 3 days' exposure at the average temperature of about 75° C., a complete kill of the infesting insects is observed at all levels in the grain. The fumigated grain is thereafter aerated for 2 weeks. At the end of this period, the treated grain is not characterized by any off-taste or offensive odor attributable to the action of the nitromethane compound.

EXAMPLE 6

Bromodifluoronitromethane is also employed for the fumigation of wheat flour. In such operations, flour infested with adult confused flour beetles and black carpet beetle larvae is placed in a fumigant chamber and the methane compound introduced into the chamber as an 80 percent dispersion in carbon tetrachloride in an amount sufficient to provide a concentration of 0.05 pound per 1000 cubic feet. In the fumigation operations, the flour is exposed to the vapors of the toxicant for about 16 hours. As a result of this exposure, there is obtained a 100 percent kill of the infesting organisms to a depth of 9 inches in the finely milled product. The flour is then aerated. Sensory examination and inspection of the flour, one week following the exposure, indicates no evidence of off-taste or offensive odor attributable to the action of the methane compound.

EXAMPLE 7

Corn infested with the larvae and pupae of granary weevils and Angoumois grain moth (*Sitotroga cerealella*) is fumigated with a one percent solution of bromodifluoronitromethane in methylene chloride by treating the corn in a fumigant chamber to the composition at a dosage of 0.25 pound of bromodifluoronitromethane per 1000 cubic feet of space. In the fumigation operations, the corn is exposed to the vapors of the toxicant compound in the composition for a period of 16 hours. As a result of these operations, there is obtained a 100 percent kill of the larvae and pupae of both insect species.

EXAMPLE 8

Bromodifluoronitromethane is employed for the line fumigation of dried prunes packaged in sealed bags of saran (polyvinylidene chloride) film. In such operations, the nitromethane compound is mixed with monochlorotrifluoromethane in a pressure container to prepare a self-propellent composition containing 80 percent by weight of methane compound. The pressure container is equipped with a metering valve to discharge a measured portion of the toxicant through a needle orifice into each packaged food container. The amount of the composition introduced into each food container is sufficient to provide in each package a concentration of 3.0 pounds of methane compound per 1000 cubic feet. Following the introduction of the fumigant, the discharge needle is withdrawn from the bag and the perforation therein sealed. The fumigated prunes and unfumigated but similarly packaged prunes are then stored at an average temperature of about 75° F. After one month of storage, various of the fumigated and unfumigated packages are selected at random and examined for the development of mold and mildew on the packaged contents. The examination shows a commercial control of mildew and mold on the fumigated prunes with many of the unfumigated and packaged prunes showing a heavy growth of these organisms.

EXAMPLE 9

Bromodifluoronitromethane is employed for the fumigation of an enclosure, the interior surfaces and walls of which are infested with termites. In such operation, a one percent solution of the methane compound in carbon tetrachloride is introduced into the enclosure in an amount sufficient to provide a concentration of 0.12 pound of the methane compound per 1000 cubic feet of space. The interior surface of the enclosure and its infesting organisms are thereafter exposed to the vapors of the methane compound for a period of 16 hours and at a temperature of about 75° F. As a result of this operation, there is obtained a 100 percent kill of termites.

EXAMPLE 10

Fifty parts by weight of bromodifluoronitromethane and 45 parts of dimeric alkylated aryl polyether alcohol (Triton X-155) are mixed together to prepare a concentrate composition in the form of an emulsifiable liquid.

Also, 90 parts by weight of bromodifluoronitromethane and 10 parts of a sorbitan monolaurate polyoxyethylene derivative (Tween 20) are mechanically mixed together to prepare a water-dispersible concentrate composition.

These compositions are adapted to be dispersed in water to produce aqueous compositions having very desirable wetting and penetrating properties. The latter compositions are adapted to be employed to treat soil and distribute the bromodifluoronitromethane therein in effective concentrations.

EXAMPLE 11

Bromodifluoronitromethane is dissolved in a low boiling petroleum hydrocarbon fraction (Stoddard solvent) to produce a composition having a flash point greater than 100° F. and containing about 35 percent by weight of the compound. The hydrocarbon solvent has a boiling range of from about 312° to 390° F. and a flash point of about 116° F. This composition is employed for the treatment of soil of good nutrient content heavily infested with root-knot nematodes. In the treating operations, the toxicant composition is injected into the soil in rows 12 inches apart, the injections being made at 4 inch intervals and at a depth of about 6 inches below the soil surface. The amount of composition employed is sufficient to supply 10 pounds of bromodifluoronitromethane per acre. The latter dosage corresponds to a concentration of about 3 parts by weight of bromodifluoronitromethane per million parts by weight of soil. Following the distribution, the average soil temperature remains at about 62° F. for the period of the determination.

Seven days after treatment, the soil is seeded with tomatoes, the seeded soil being that positioned about 2 inches from the loci of treatment. Untreated check plots are also planted with tomato seeds. During the subsequent growing period, there is observed no adverse affect upon the germination and growth of seedlings attributable to the presence of residual toxicant. Five weeks after seeding, the plants are lifted from the soil and the roots examined for gall formation attributable to nematode attack. The examination indicates a commercial control of nematodes in the treated soil with heavy infestation in the check plots.

EXAMPLE 12

An acetone solution containing 2.5 grams of bromodifluoronitromethane per 100 milliliters of solution is employed for the treatment of sandy loam soil heavily infested with the organisms of *Fusarium solani*, Pythium spp. and *Rhizoctonia solani*. In the treating operations, the soil is placed in sealable containers and injected with the acetone composition in an amount sufficient to provide 5 parts by weight of bromodifluoronitromethane per million parts by weight of soil. Following the treatment, the containers are sealed and the soil therein mechanically mixed to insure uniform distribution of the toxicant composition. After mixing, the containers of treated soil are incubated at an average temperature of 25° C.

In a check operation, sealed containers containing the same infested but untreated soil are exposed to identical conditions as the treated soil. After three days, the containers are opened and portions of the treated and untreated soil cultured on nutrient agar to determine the percent control of fungus organisms. As a result of these operations, there was found a 100 percent control of the complex of root-rot fungi in the treated soil. The culturing operations establish the untreated check soil to contain a heavy infestation of the complex of root-rot fungi.

A preferred embodiment of the invention comprises a petroleum distillate solution of bromodifluoronitromethane. The petroleum distillates to be controlled in such embodiment are carefully cut portions boiling almost entirely under 400° F. at atmospheric pressure and having a flash point above about 80° F. These compositions are characterized by having excellent penetrating properties and by being a low fire hazard to the shipper and user.

What is claimed is:

1. A method for controlling insects, fungi and nematodes which comprises fumigating said organisms with a lethal concentration of bromodifluoronitromethane.

References Cited

FOREIGN PATENTS 770,618 3/1957 Great Britain.
562,549 9/1958 Canada.

ALBERT T. MEYERS, *Primary Examiner.*

J. D. GOLDBERG, *Assistant Examiner.*